United States Patent
Foukas et al.

(10) Patent No.: US 12,260,251 B2
(45) Date of Patent: Mar. 25, 2025

(54) SHARING OF COMPUTE RESOURCES BETWEEN THE VIRTUALIZED RADIO ACCESS NETWORK (vRAN) AND OTHER WORKLOADS

(71) Applicant: Microsoft Technology Licensing, LLC, Redmond, WA (US)

(72) Inventors: Xenofon Foukas, Cambridge (GB); Bozidar Radunovic, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 648 days.

(21) Appl. No.: 16/941,033

(22) Filed: Jul. 28, 2020

(65) Prior Publication Data

US 2022/0035665 A1 Feb. 3, 2022

(51) Int. Cl.
| | |
|---|---|
| G06F 9/46 | (2006.01) |
| G06F 9/48 | (2006.01) |
| G06F 9/50 | (2006.01) |
| G06N 5/01 | (2023.01) |
| G06N 20/00 | (2019.01) |

(52) U.S. Cl.
CPC ............ *G06F 9/4887* (2013.01); *G06F 9/505* (2013.01); *G06N 5/01* (2023.01); *G06N 20/00* (2019.01); *G06F 2209/5019* (2013.01)

(58) Field of Classification Search
CPC .................. G06F 9/4887; G06F 9/505; G06F 2209/5019; G06N 5/01; G06N 5/003
See application file for complete search history.

(56) References Cited

U.S. PATENT DOCUMENTS

| | | | | |
|---|---|---|---|---|
| 7,165,252 | B1 * | 1/2007 | Xu ......................... | G06F 9/4887 |
| | | | | 718/100 |
| 9,753,772 | B2 * | 9/2017 | Xu ......................... | G06F 9/4887 |
| 10,613,899 | B1 * | 4/2020 | Saha ....................... | G06N 20/00 |
| 10,684,964 | B1 * | 6/2020 | Gordon ................. | G06F 3/0634 |

(Continued)

FOREIGN PATENT DOCUMENTS

| | | |
|---|---|---|
| CN | 104540234 B | 3/2018 |
| JP | 2015188158 A * | 10/2015 |

(Continued)

OTHER PUBLICATIONS

"Long-tail traffic", Retrieved from: https://web.archive.org/web/20160827181215/https://en.wikipedia.org/wiki/Long-tail_traffic, Retrieved on: Aug. 27, 2016, 9 Pages.

(Continued)

*Primary Examiner* — April Y Blair
*Assistant Examiner* — Zhi Chen
(74) *Attorney, Agent, or Firm* — RAY QUINNEY & NEBEKER; Tiffany Healy

(57) ABSTRACT

The present disclosure relates to systems and methods for sharing compute resources. The systems and methods may include identifying a plurality of workloads to complete by a deadline. The systems and methods may include generating a performance prediction for each workload of the plurality of workloads. The systems and methods may use the performance prediction to calculate a number of compute resources required for the plurality of workloads to complete by the deadline. The systems and methods may schedule the plurality of workloads across the number of compute resources.

20 Claims, 8 Drawing Sheets

(56) References Cited

U.S. PATENT DOCUMENTS

| | | | |
|---|---|---|---|
| 11,379,267 B1* | 7/2022 | Tran | G06F 9/4881 |
| 2004/0025069 A1* | 2/2004 | Gary | G06F 1/3296 |
| | | | 713/300 |
| 2012/0155265 A1* | 6/2012 | Ballani | H04L 47/805 |
| | | | 370/235 |
| 2013/0253808 A1* | 9/2013 | He | G06Q 10/00 |
| | | | 701/117 |
| 2014/0068059 A1* | 3/2014 | Cole | H04L 41/12 |
| | | | 709/224 |
| 2015/0277987 A1* | 10/2015 | Di Balsamo | G06F 9/5083 |
| | | | 718/104 |
| 2015/0293787 A1* | 10/2015 | Bilavarn | G06F 9/4881 |
| | | | 718/102 |
| 2016/0306547 A1* | 10/2016 | Perlstein | G06F 3/0688 |
| 2017/0090666 A1* | 3/2017 | Pahud | G06F 3/038 |
| 2017/0171882 A1* | 6/2017 | Sundararajan | H04W 72/1268 |
| 2019/0080362 A1* | 3/2019 | Acuna Agost | G06Q 30/0275 |
| 2020/0050970 A1* | 2/2020 | Tanaka | G06N 5/003 |
| 2020/0120614 A1* | 4/2020 | Gresset | G06F 17/18 |
| 2020/0214022 A1* | 7/2020 | Harstead | H04W 28/0236 |
| 2020/0228602 A1* | 7/2020 | Spoczynski | H04L 67/56 |
| 2020/0241927 A1* | 7/2020 | Yang | G06F 9/466 |
| 2022/0101725 A1* | 3/2022 | Kobayashi | G08G 1/017 |
| 2022/0329535 A1* | 10/2022 | Li | H04L 45/22 |

FOREIGN PATENT DOCUMENTS

| | | | | |
|---|---|---|---|---|
| KR | 20190119223 A | * | 10/2019 | |
| WO | WO-2013164038 A1 | * | 11/2013 | ......... H04L 65/4076 |

OTHER PUBLICATIONS

Ku, et al., "5G Radio Access Network Design with the Fog Paradigm: Confluence of Communications and Computing", In Journal of IEEE Communications Magazine, vol. 55, Issue 4, Apr. 14, 2017, pp. 46-52.

Lu, et al., "An Artificial Intelligence Enabled F-RAN Testbed", In Journal of IEEE Wireless Communications, vol. 27, Issue 2, May 13, 2020, pp. 65-71.

"International Search Report and Written Opinion Issued in PCT Application No. PCT/US2021/034120", Mailed Date: Aug. 31, 2021, 15 Pages.

Jambur, et al., "OpenNESS Radio Access Network", Retrieved from: https://github.com/openness/specs/blob/master/doc/ran/openness_ran.md, Retrieved Date: Jun. 19, 2020, 15 Pages.

Everich, et al., "Reconciling High Server Utilization and Sub-Millisecond Quality-Of-Service", In Proceedings of Ninth European Conference on Computer Systems, Apr. 14, 2014, 14 Pages.

* cited by examiner

SHARING OF COMPUTE RESOURCES BETWEEN THE VIRTUALIZED RADIO ACCESS NETWORK (vRAN) AND OTHER WORKLOADS

CROSS-REFERENCE TO RELATED APPLICATIONS

N/A

BACKGROUND

Virtualized Radio Access Networks (vRAN) are part of the mobile network architecture that provides the wireless connectivity to mobile users in the form of base stations. In contrast to previous mobile network generations, in which base stations were specialized hardware boxes, 5G mobile networks and beyond rely on fully virtualized RAN functions (e.g., in the form of containers), running on commodity x86 servers at the edge. The most demanding part of the vRAN stack in terms of the required compute resources is the physical layer (L1) that is responsible for performing the signal processing tasks of base stations, requiring more than 60% of the overall vRAN compute resources. One of the key characteristics of the physical layer of the vRAN is its (soft) real-time requirement, i.e., the signal processing operation for a transmission and/or reception must be completed within a strict deadline (0.125 us-1 ms), otherwise users experience degraded performance at best or a complete disconnection from the network in the worst case.

Avoiding such performance degradation is critical for 5G networks, since they are required to provide services with very high levels of reliability (up to 5 nines) and low latency. In order to ensure that the vRAN can meet those strict deadlines, the standard practice of the industry is to use isolated compute resources (dedicated CPU cores, dedicated cache and DRAM, etc.) and to provision the vRAN for peak capacity. A major disadvantage of this practice is that a large portion of the compute resources allocated to the vRAN are left unutilized most of the time, given that the base stations operate with light or medium levels of traffic and not at peak capacity during most hours of the day. Up to 80% of the CPU resources allocated to the vRAN might be left unutilized, which can be very inefficient considering the fact that more than 10 million CPU cores are expected to be used by telco operators to cover their physical layer vRAN demands.

As such, there is a need in the art for improvements in using compute resources at the edge.

SUMMARY

In accordance with one aspect of the present disclosure, a method is disclosed that includes identifying a plurality of virtualized Radio Access Networks (vRAN) workloads and a plurality of other workloads. The method also includes generating a performance prediction for each workload of the plurality of vRAN workloads that indicates a prediction for how long each workload of the plurality of vRAN workloads will take to complete. The method also includes calculating based on the performance prediction a number of compute resources required for the plurality of vRAN workloads to use to complete by a deadline. The method also includes scheduling the plurality of vRAN workloads across the number of compute resources required, determining a remaining number of available compute resources, and scheduling the plurality of other workloads across the remaining number of available compute resources.

The plurality of vRAN workloads may include one or more signal processing tasks for a base station or data link layer (L2) tasks.

The deadline may be a transmission deadline for transmission of the one or more signal processing tasks with the base station or reception of the one or more signal processing tasks with the base station.

The performance prediction may be generated by using a machine learning model to generate a plurality of quantile decision trees. Each quantile decision tree may be associated with an individual signal processing task. The performance prediction may also be generated by identifying a tail latency of a leaf node in a corresponding quantile decision tree for the individual signal processing task for each of the one or more signal processing tasks.

The tail latency may indicate a predicted worst case execution time for each workload of the plurality of vRAN workloads.

The machine learning model may be trained with offline samples of signal processing tasks and online samples of signal processing tasks.

Calculating the number of compute resources required may further include determining a predicted base station worst case execution time for the base station by summing the performance predictions for each workload and calculating the number of compute resources required to complete the plurality of workloads by the deadline based on the predicted base station worst case execution.

In accordance with another aspect of the present disclosure, a server is disclosed that includes a memory to store data and instructions and at least one processor in communication with a plurality of compute resources and a virtualized Radio Access Network (vRAN). The at least one processor is operable to identify a plurality of vRAN workloads and a plurality of other workloads. The at least one processor is also operable to generate a performance prediction for each workload of the plurality of vRAN workloads that indicates a prediction for how long each workload of the plurality of vRAN workloads will take to complete. The at least one processor is also operable to calculate based on the performance prediction a number of compute resources of the plurality of compute resources required for the plurality of vRAN workloads to complete by a deadline. The at least one processor is also operable to schedule the plurality of vRAN workloads across the number of compute resources required. The at least one processor is also operable to determine a remaining number of available compute resources of the plurality of compute resources. The at least one processor is also operable to schedule the plurality of other workloads across the remaining number of available compute resources.

The plurality of vRAN workloads may include one or more signal processing tasks for a base station or data link layer (L2) tasks.

The deadline may be a transmission deadline for transmission of the one or more signal processing tasks with the base station or reception of the one or more signal processing tasks with the base station.

The at least one processor may be further operable to generate the performance prediction by using a machine learning model to generate a plurality of quantile decision trees. Each quantile decision tree may be associated with an individual signal processing task. The at least one processor may be further operable to generate the performance prediction by identifying a tail latency of a leaf node in a corresponding quantile decision tree for the individual signal processing task for each of the one or more signal processing tasks.

The tail latency may indicate a predicted worst case execution time for each workload of the plurality of vRAN workloads.

The machine learning model may be trained with offline samples of signal processing tasks and online samples of signal processing tasks.

The at least one processor may be further operable to calculate the number of compute resources required by determining a predicted base station worst case execution time for the base station by summing the performance predictions for each workload and calculating the number of compute resources required to complete the plurality of workloads by the deadline based on the predicted base station worst case execution.

In accordance with one aspect of the present disclosure, a method is disclosed for identifying a plurality of workloads to complete, generating a performance prediction for each workload of the plurality of workloads that indicates a prediction for how long each workload of the plurality of workloads will take to complete, identifying a quantile at a tail latency of the performance prediction for each workload of the plurality of workloads, calculating based on the quantile a number of compute resources required for the plurality of workloads to complete by a deadline, and scheduling the plurality of workloads across the number of compute resources.

The tail latency may be a range of values that indicate a slow runtime of the workload.

The performance prediction may be generated using a machine learning model.

The machine learning model may generate a plurality of quantile decision trees for each workload and the tail latency may be identified in a leaf node of each quantile decision tree of the plurality of quantile decision trees.

The plurality of compute resources may include one or more of a central processing unit (CPU) core, a field programmable gate array (FPGA), a graphics processing unit (GPU), or other hardware accelerators.

The deadline may be a transmission deadline for the plurality of workloads or a completion deadline for the plurality of workloads.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
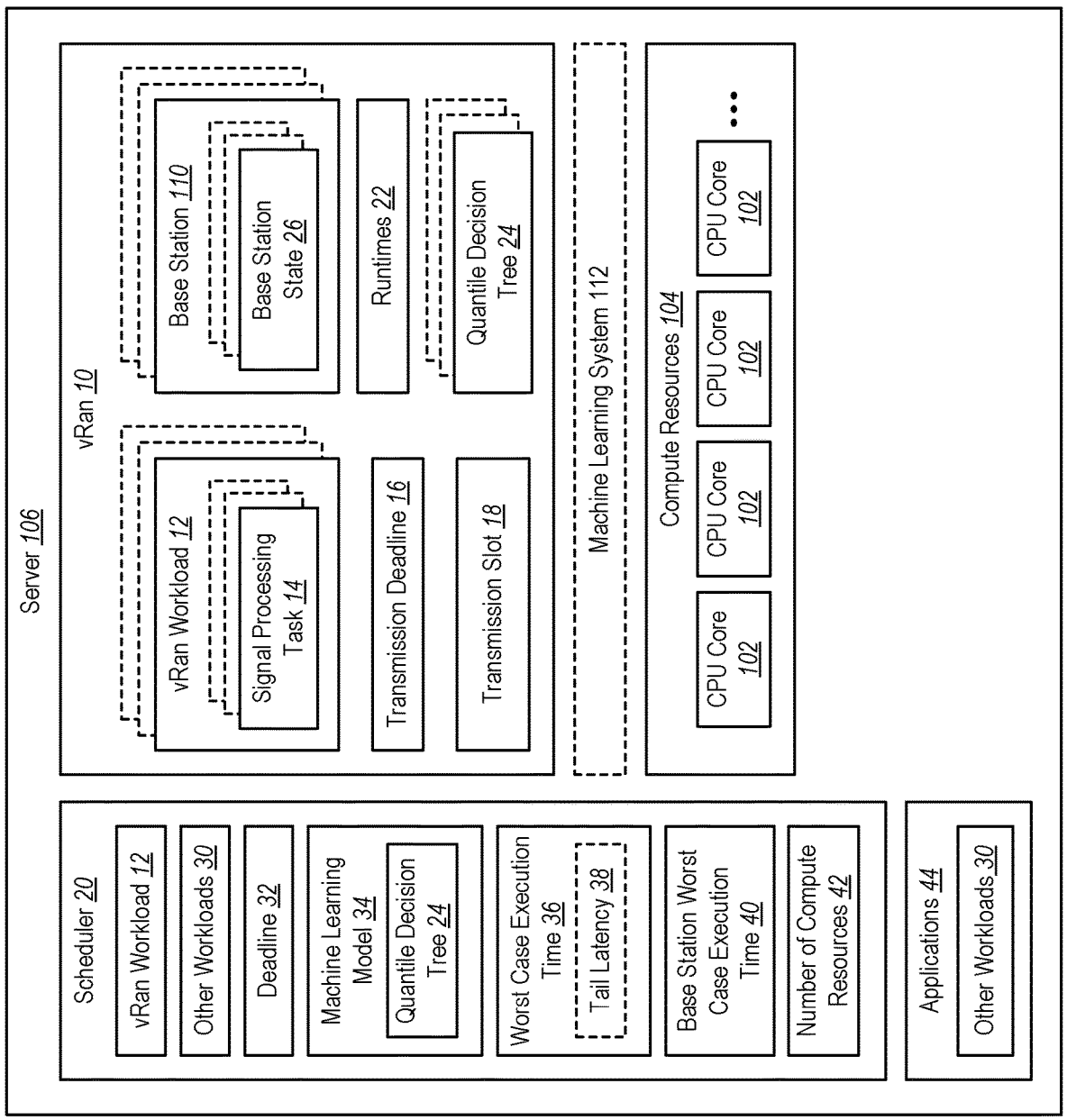
FIG. 1 illustrates an example server for use with sharing compute resources at the edge in accordance with an implementation of the present disclosure.

This disclosure relates generally to sharing compute resources at the edge. The edge may include a boundary of a network. Virtualized Radio Access Networks (vRAN) are part of the mobile network architecture that provides the wireless connectivity to mobile users in the form of base stations. 5G mobile networks and beyond rely on fully virtualized RAN (vRAN) functions (e.g., in the form of containers), running on commodity x86 servers at the edge. The most demanding part of the vRAN stack in terms of the required compute resources is the physical layer (L1) that is responsible for performing the signal processing tasks of base stations, requiring more than 60% of the overall vRAN compute resources. One of the key characteristics of the physical layer of the vRAN is its (soft) real-time requirement, i.e., the signal processing operation for a transmission and/or reception must be completed within a strict deadline (0.125 us-1 ms), otherwise users experience degraded performance at best or a complete disconnection from the network in the worst case.

Avoiding such performance degradation is critical for 5G networks, since 5G networks are required to provide services with very high levels of reliability (up to 5 nines) and low latency. To ensure that the vRAN can meet those strict deadlines, the standard practice of the industry is to use isolated compute resources (dedicated CPU cores, dedicated cache and DRAM, etc.) and to provision the vRAN for peak capacity.

The dedicated deployment includes configurations, such as, isolating the required CPU cores, partitioning the cache and DRAM, and not allowing any other type of workload except the vRAN function to run on the same server simultaneously. Similar configurations are also expected by other implementations which are mainly used for prototyping and evaluating vRAN related algorithms and applications.

Due to the isolated deployment configuration of the solutions that use dedicated deployment, the scheduling frameworks do not provide any mechanism for the prediction of the CPU requirements of vRAN tasks at runtime. The scheduling frameworks assume that the required compute resources are always available and are completely unaware of the signal processing deadlines and the time (average or worst case) that it might take for any vRAN task to complete. If the compute resources were to be shared with other workloads, the scheduling frameworks would not be able to adjust the allocation of CPU cores across workloads, which, may result in significant interference and violation of the SLAs of telco operators. As a result, such scheduling frameworks make it impossible to reclaim idle CPU cycles when the vRAN has a low or medium traffic load.

In the more general space of the cloud, there exist a number of userspace CPU scheduling frameworks for enabling the collocation of low-latency workloads. However, none of those solutions are aware of deadlines and the worst case execution time (WCET) of tasks, meaning that in the worst case the tail latency of processing vRAN tasks could still be high, leading to missed deadlines and low reliability (at most 3 nines). Moreover, most of those solutions require the collocated workloads to be implemented using specific constraining application programming interfaces (APIs), meaning that generic workloads running on containers or virtual machines (VMs) cannot be deployed on top of them. Finally, there exist a number of deadline scheduling framework solutions in the space of embedded systems. However, such solutions need to provide hard real-time guarantees (i.e., a deadline must never be missed) and therefore their design is based on the assumption that no other workload is running on the same hardware. If these assumptions are violated, these solutions would no longer work.

An alternative approach is to reclaim the unutilized CPU cores at runtime and to allow them to be used for other workloads collocated at the edge and running on VMs or containers (e.g., edge caching applications, databases, etc.). The problem with this approach is that if the collocated workloads are included in a naïve way, the collocated workloads can introduce significant levels of interference that can negatively affect the performance of the vRAN, leading to missed deadlines of the signal processing tasks and therefore to violations of the telco operators' SLAs (which is the reason that this practice is avoided in the first place).

The devices and methods provide a userspace CPU scheduling framework that enables the statistical multiplexing between the high priority vRAN workloads and other best-effort workloads running on the same CPU cores. This disclosure includes several practical applications that provide benefits and/or solve problems associated with sharing compute resources at the edge.

The devices and methods provide a scheduler that predicts the worst case execution time (WCET) of individual vRAN signal processing tasks by observing the vRAN traffic characteristics in real-time, i.e. during each transmission and/or reception slot. Based on this prediction and on the knowledge of the transmission and/or reception deadline, the scheduler is able to predict the vRAN CPU requirements and to decide how to allocate the available CPU cores among the vRAN workloads and the other workloads in order to minimize interference, while reclaiming the idle CPU cycles. Interference may include an increase in processing time for vRAN workloads due to other task operating on the operating system (OS) utilizing the same resources needed for the vRAN workloads. In an implementation, the scheduler may use a machine learning model that uses a set of quantile decision trees in order to predict the expected WCET of the vRAN tasks in real-time based on the current state of the base station and on a set of collected samples of recent task runtimes.

The scheduler may make scheduling decisions at a very fine time granularity (20 us), which allows the scheduler to intervene and proactively acquire more CPU cores for the vRAN if on track to miss a deadline, e.g. due to a misprediction of the expected vRAN CPU requirements or due to unexpected interference from other collocated workloads or the OS. As a result, the methods and devices may reclaim a large portion (up to 70%) of the compute resources allocated to the vRAN, which can now be used by other workloads, without violating any signal processing deadlines.

The methods and devices may be expanded to incorporate other compute resources except the CPU (e.g., to include field programmable gate arrays (FPGAs), graphics processing units (GPUs) and other hardware accelerators) and to also support distributed implementations of the vRAN L1 (e.g. across multiple servers on the same rack).

As such, the methods and devices may use a deadline-aware scheduler with WCET prediction capabilities allowing for the collocation of workloads and the improvement in the utilization of the CPU resources, while meeting the deadline requirements of the vRAN. The deadline aware userspace CPU scheduler allows the collocation of vRAN physical layer signal processing tasks on the same x86 server as other best-effort workloads running on containers or VMs.

The methods and devices may also use a machine learning based prediction model using quantile decision trees and both offline and online training in order to predict WCET of vRAN signal processing tasks. Predicting WCET of vRAN signal processing allows the deadline scheduler to make sophisticated decisions about the vRAN CPU requirements and allocation.

Referring now to FIG. 1, a server 106 for sharing compute resources at the edge may include a plurality of compute resources 104 available for use for different workloads. The plurality of compute resources 104 may include one or more CPU cores 102 up to m, where m is an integer that may be used for different workloads at the edge. In addition, the plurality of compute resources 104 may include FPGAs, GPUs and other hardware accelerators.

Server 106 may also include a Virtualized Radio Access Network (vRAN) 10 that may be used to communicate with one or more base stations 110. vRAN 10 may include a plurality of vRAN workloads 12 for communicating with base station 110. vRAN workloads 12 may include, but are not limited to, real-time workloads, low-latency workloads and/or data link layer (L2) tasks. Examples of L2 tasks may include medium access control (MAC) tasks, radio link control (RLC) tasks, and/or packet data convergence protocol (PDCP) tasks. An example of low-latency vRAN workloads 12 may include, but is not limited to, different signal processing tasks 14 of base station 110. The signal processing tasks 14 may have a transmission deadline 16 where the signal processing operation for a transmission and/or reception with base station 110 must be completed, otherwise user devices in communication with base station 110 may experience degraded performance at best or a complete disconnection from the network in the worst case. An example range of values for the transmission deadline 16 may include 0.125 us to 1 ms.

vRAN 10 may communicate with base station 110 during a transmission slot 18. The transmission slots 18 may be a time interval during which the vRAN 10 may transmit signals to base station 110 and/or receive signals from base station 110. For example, the vRAN 10 may have transmission slots 18 of 1 ms and may communicate with the base station 110 every 1 ms. Once a transmission slot 18 is complete, a new transmission slot 18 may start and vRAN 10 may continue to communicate with base station 110 using the new transmission slot 18.

vRAN 10 may store a base station state 26 with various features of base station 110 in memory. The base station state 26 may include a plurality of features present in the base station 110 when the transmission slot 18 occurred.

Server 106 may allocate one or more available compute resources 104 for vRAN 10 to use for signal processing tasks 14. Server 106 may also include a scheduler 20 that may be used to allocate various workloads across the available compute resources 104. Scheduler 20 may identify a plurality of workloads available for processing at server 106. The plurality of workloads may include vRAN workloads 12 and other workloads 12 from one or more applications 44. The vRAN workloads 12 may include a plurality of signal processing tasks 14 of base stations 110. Examples of signal processing tasks 14 may include, but are not limited to, encoding tasks, decoding tasks, layer mapping tasks, layer de-mapping tasks, modulation tasks, and/or demodulation tasks.

In addition, the other workloads 12 may include any processing that may be occurring by applications 44 at the edge. Other workloads 12 may include, but are not limited to, graphics workloads, database workloads, video workloads, internet of things (IoT) workloads, gaming workloads, and/or artificial intelligence workloads. Applications 44 may be part of server 106 and/or may be in communication with server 106 from a remote location.

Scheduler 20 may determine a deadline 32 associated with the vRAN workloads 12. The deadline 32 may be the transmission deadline 16 for the base station 110 for which all signal processing tasks 14 must be completed by in order to prevent performance degradation. As such, scheduler 20 may determine any deadlines that must be met by the vRAN workloads 12.

Scheduler 20 may predict the worst case execution time 36 of individual signal processing tasks 14 by observing the vRAN traffic characteristics in real-time during transmission slot 18.

In an implementation, scheduler 20 may use a machine learning model 34 generated by a machine learning system 112 that uses a set of quantile decision trees 24 in order to predict the worst case execution time 36 of the vRAN signal processing tasks 14 in real-time based on the current base station state 26 and on a set of collected online samples of recent task runtimes 22. For example, scheduler 20 may use a quantile decision tree 24 of a machine learning model 34 to identify a tail latency 38 of the runtimes 22 of the signal processing tasks 14. Scheduler 20 may use the tail latency 38 for individual signal processing tasks 14 to predict the worst case execution time 36 of the individual signal processing tasks 14.

Based on the predicted worst case execution time 36 and knowledge of the deadline 32, scheduler 20 may predict a number of compute resources 42, such as, a number of CPU cores 102 that vRAN 10 may require, and may decide how to allocate the compute resources 42 among the vRAN workloads 12 and the other workloads 12 in order to minimize interference, while reclaiming the idle CPU cycles. Interference may include an increase in processing time for signal processing tasks 14 due to other task operating on the OS utilizing the same resources needed for the signal processing tasks 14.

The number of compute resources 42 required may ensure that the signal processing tasks 14 for the vRAN workloads 12 may be completed by the transmission deadline 16. Scheduler 20 may use a prediction of the worst case execution time 36 of the signal processing tasks in calculating a predicted base station worst case execution time 40. Scheduler may use the predicted base station worst case execution time 40 in determining the number of compute resources 42 required for the vRAN workloads 12.

Scheduler 20 may allocate the plurality of workloads across the number of available compute resources 104. Scheduler 20 may allocate the vRAN workloads 12 across the number of compute resources 42 required. In addition, scheduler 20 may schedule the other workloads 12 on any remaining compute resources 104 that may be available after scheduling the vRAN workloads 12 on the number of compute resources 42 required (e.g., any remaining CPU cores 102 not in use for vRAN workloads 12). Thus, the vRAN workloads 12 and the other workloads 12 may be collocated on the plurality of available compute resources 104 simultaneously.

Scheduler 20 may take into account the transmission deadlines 16 for the vRAN workloads 12 when determining an order for the various tasks for the workloads. Scheduler 20 may apply a higher priority to the one or more vRAN workloads 12 relative to other workloads 12. As such, scheduler 20 may ensure the one or more vRAN workloads 12 are processed first by the available compute resources 104 before other workloads 12 are processed. Moreover, if a particular processing task 14 is taking longer than expected by scheduler 20, scheduler 20 may increase the number of compute resources 104 allocated to vRAN 10 to ensure that the processing task 14 is completed by the transmission deadline 16.

Scheduler 20 may make scheduling decisions at a predetermine time interval. For example, scheduler 20 may make scheduling decisions every 20 us. As such, scheduler 20 may make scheduling decisions at a very fine time granularity (20 us), which allows scheduler 20 to intervene and proactively acquire more CPU cores 102 for vRAN 10 if on track to miss a deadline, e.g. due to a misprediction of the expected vRAN CPU requirements or due to unexpected interference from other collocated workloads or the OS. As a result, scheduler 20 may reclaim a large portion (up to 70%) of the compute resources 104 available at server 106, which can now be used by other workloads 12, without violating any signal processing deadlines.

Server 106, compute resources 104, machine learning system 112, and/or vRAN 10 may include features and functionality described below in connection with FIG. 9. In addition, the components of scheduler 20 may include hardware, software, or both. For example, the components of scheduler 20 may include one or more instructions stored on a computer-readable storage medium and executable by processors of one or more computing devices. When executed by the one or more processors, the computer-executable instructions of one or more computing devices (e.g., scheduler 20) can perform one or more methods described herein. Alternatively, the components of scheduler 20 may include hardware, such as a special purpose processing device to perform a certain function or group of functions. Additionally, or alternatively, the components of scheduler 20 may include a combination of computer-executable instructions and hardware.

Figure 2:
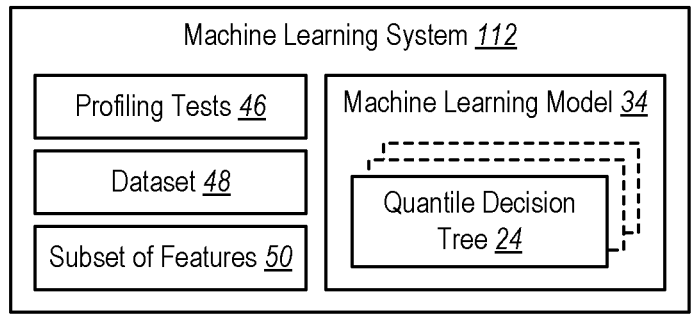
FIG. 2 illustrates an example machine learning system in accordance with an implementation of the present disclosure.

Referring now to FIG. 2, illustrated is an example machine learning system 112 that may be used with server 106 (FIG. 1). In an implementation, machine learning system 112 may be included in server 106. In another implementation, machine learning system 112 may be remote from server 106 and in communication with server 106.

Machine learning system 112 may be used to generate one or more machine learning models 34 that may be used to for performance predictions for the workloads. For example, machine learning models 34 may be used to predict processing times for one or more signal processing tasks 14 for vRAN 10. The machine learning model 34 may receive information with different assumptions and/or input data for a large collection of samples for different signal processing tasks 14. As additional information is received by machine learning system 112, the machine learning model 34 may continuously learn and update the machine learning model 34 for the different signal processing tasks 14.

In an implementation, the machine learning model 34 may be a quantile decision tree 24 generated in response to running one or more profiling tests 46 for the signal processing tasks 14. Machine learning system 112 may run one or more performance profiling tests 46 for a plurality of signal processing tasks 14 performed by the vRAN 10 in communication with a base station 110. The performance profiling tests 46 may run at the different transmission slots 18 of the vRAN 10. As such, each time the vRAN 10 communicates with a base station 110 for the signal processing tasks 14 during the transmission slots 18, different performance profiling tests 46 may run for each signal processing task 14 occurring during the transmission slot 18.

Performance profiling tests 46 may be run offline by machine learning system 112 without any other workloads 12 present on the CPU cores 102 dedicated to the signal processing tasks 14 for the vRAN 10. By running the performance profiling tests 46 offline interference may be prevented and the runtime 22 for the signal processing tasks 14 may not increase due to the presence of other workloads 12 on the CPU cores 102.

Machine learning system 112 may generate a dataset 48 for information generated from running the performance profile tests 46. The dataset 48 may include, for each transmission slot 18, a base station state 26 and the runtime 22 for the signal processing task 14 run during the performance profile tests 46. The datasets 48 generated from the one or more profiling tests 46 may be used as input information to train a machine learning model 34 based on identified trends or patterns detected within the input information.

Machine learning system 112 may perform, for each signal processing task 14, a feature selection to identify a subset of features 50 from the base station state 26 that effect the runtime 22 of the signal processing task 14. Machine learning system 112 may use a combination of techniques for identifying the selected features to include in the subset of features 50. The machine learning system 112 may select a combination of features that provide the highest level of accuracy for the subset of features 50.

Machine learning system 112 may use the subset of features 50 for each signal processing task 14 to train a quantile decision tree 24 for each signal processing task 14. Thus, there may be one quantile decision tree 24 per signal processing task 14. The different leaf nodes of the quantile decision trees 24 may include a window of values for the different runtimes 22 that resulted based on the subset of features 50.

In another implementation, the machine learning model 34 may include a gradient boost regressor trained by the machine learning system 112. For example, the machine learning system 112 may receive as inputs runtimes 22 of different signal processing tasks 14. The machine learning system 112 may normalize the different runtimes 22 are normalized by online noise. Online noise may include, but is not limited to, other tasks running at the same time as the signal processing tasks 14 using the same resources as the signal processing tasks 14. The machine learning system 112 may try to identify any increases in execution time of the signal processing tasks 14 due to the other tasks running and normalize the runtimes 22 based on this increase execution time.

In another implementation, the machine learning model 34 may include a cubist decision tree. For example, the machine learning system 112 may receive as inputs runtimes 22 of different signal processing tasks 14 and may train a cubist decision tree with the inputs.

As such, the machine learning system 112 may generate any number of different machine learning models 34 that scheduler 20 (FIG. 1) may use in predicting an execution time for signal processing tasks 14 and/or a predicted worst case execution time 36 for signal processing tasks 14.

Figure 3:
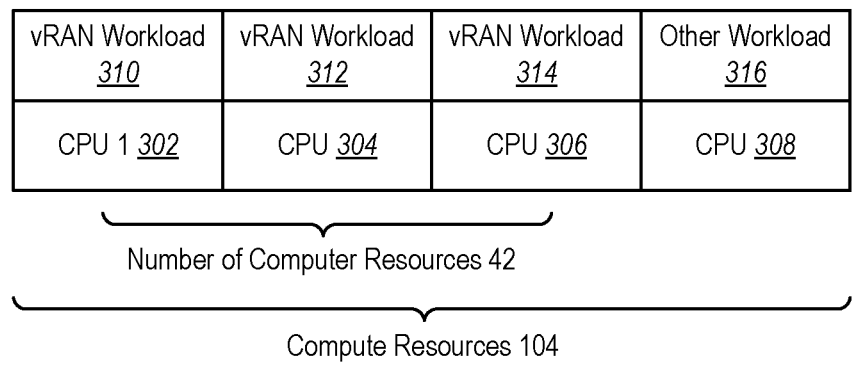
FIG. 3 illustrates an example of scheduling workloads across a plurality of compute resources in accordance with an implementation of the present disclosure.

Referring now to FIG. 3, illustrated is an example of scheduling workloads across a plurality of compute resources 104 available for use by scheduler 20 (FIG. 1). Server 106 (FIG. 1) may include a plurality of compute resources 104 available for use for processing the workloads. The plurality of workloads may include vRAN workloads 310, 312, 314 and other workload 316.

Scheduler 20 may calculate a number of compute resources 42 required for the vRAN workloads 310, 312, 314 to complete by the determined deadline 32 (FIG. 1). In the illustrated example, scheduler 20 may calculate that three compute resources (e.g., CPU1 302, CPU2 304, CPU3 306) are required to ensure that the vRAN workloads 310, 312, 314 are completed by the deadline 32.

Scheduler 20 may allocate the plurality of vRAN workloads 310, 312, 314 across the number of compute resources 42 required. For example, scheduler 20 may allocate the vRAN workloads 310, 312, 314 across the different CPU cores, CPU1 302, CPU2 304, CPU3 306.

Scheduler 20 may schedule the other workload 316 on any remaining compute resources 104 that may be available after scheduling the vRAN workloads 310, 312, 314 on the number of compute resources 42 required for the vRAN workloads 310, 312, 314. For example, if server 106 had four CPU cores available for use and scheduler 20 used three CPU cores, CPU1 302, CPU2 304, CPU3 306, for the vRAN workloads 310, 312, 314, scheduler 20 may schedule the other workload 316 across the remaining CPU core, CPU4 308 available. Thus, the vRAN workloads 310, 312, 314 and the other workload 316 may be collocated on the plurality of available compute resources 104 simultaneously.

Scheduler 20 may ensure that the vRAN workloads 310, 312, 314 may complete by any required deadlines 32 when scheduling the vRAN workloads 310, 312, 314 and/or the other workloads 316. As such, scheduler 20 may take into account the deadlines 32 for the vRAN workloads 310, 312, 314 when determining a scheduling order for the various vRAN workloads 310, 312, 314 and other workloads 316.

Scheduler 20 may apply a higher priority to the one or more vRAN workloads 310, 312, 314 relative to other workloads 316. As such, scheduler 20 may ensure the one or more vRAN workloads 310, 312, 314 are processed first by the available compute resources 104 before other workloads 316 are processed by the available compute resources 104.

Figure 4:
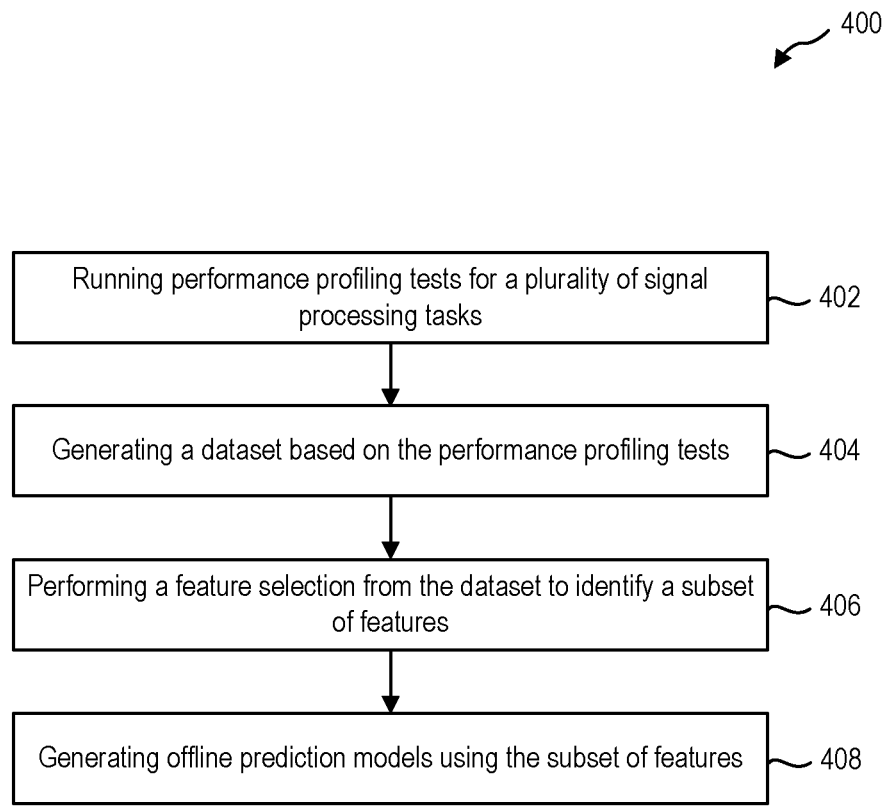
FIG. 4 illustrates an example method for offline training of a quantile decision tree in accordance with an implementation of the present disclosure.

Referring now to FIG. 4, an example method 400 may be used by a machine learning system 112 (FIG. 1) for offline training of a quantile decision tree 24 (FIG. 1). The actions of method 400 may be discussed below with reference to the architecture of FIG. 1.

At 402, method 400 may include running performance profiling tests for a plurality of signal processing tasks. Machine learning system 112 may run one or more performance profiling tests 46 for a plurality of signal processing tasks 14 performed by the vRAN 10 in communication with a base station 110. Examples of signal processing tasks 14, may include, but are not limited to, encoding tasks, decoding tasks, layer mapping tasks, layer de-mapping tasks, modulation tasks, and/or demodulation tasks.

The performance profiling tests 46 may run at the different transmission slots 18 of the vRAN 10. The transmission slots 18 may be a time interval during which the vRAN 10 may transmit signals to base station 110 and/or receive signals from base station 110. For example, the vRAN 10 may have transmission slots 18 of 1 ms and may communicate with the base station 110 every 1 ms. As such, each time the vRAN 10 communicates with a base station 110 for the signal processing tasks 14 during the transmission slots 18, different performance profiling tests 46 may run for each signal processing task 14 occurring during the transmission slot 18.

Machine learning system 112 may modify different runtime configurations (e.g., number of users, signal quality, a number of channels used, etc.) for different performance profiling tests 46 to modify a traffic load for the signal processing tasks 14 and identify a runtime 22 for each signal processing task 14. As such, each signal processing task 14 may have thousands of offline samples of runtimes 22 generated by the plurality of performance profiling tests 46.

Performance profiling tests 46 may be run offline without any other workloads 12 present on the CPU cores 102 dedicated to the signal processing tasks 14 for the vRAN 10. By running the performance profiling tests 46 offline interference may be prevented and the runtime 22 for the signal processing tasks 14 may not increase due to the presence of other workloads 12 on the CPU cores 102. Thus, the performance profiling tests 46 may identify the runtimes 22 for the different signal processing tasks 14 executed during the different performance profiling tests 46.

At 404, method 400 may include generating a dataset based on the performance profiling tests. Machine learning system 112 may generate a dataset 48 for information generated from running the performance profile tests 46. The dataset 48 may include, for each transmission slot 18, a base station state 26 and the runtime 22 for the signal processing task 14 run during the performance profile tests 46. If a plurality of signal processing tasks 14 occurred during the transmission slot 18, the dataset 48 may store at the granularity, for each transmission slot 18, the base station state 26 and runtime 22 for each signal processing task 14 that ran on the vRAN 10 during each transmission slot 18. For example, a vRAN 10 may have fifty signal processing tasks 14 that may occur at different transmission slots 18.

An example use case may include measuring 70,000 transmissions slots 18 for the vRAN 10. Thus, the dataset 48 may include 70,000 dumps of base station states 26, plus 70,000 runtimes 22 for each one of the signal processing tasks 14 that ran on the vRAN 10.

Another example use case may include performing profiling tests 46 for twelve signal processing tasks 14 for ten transmissions slots 18 of the vRAN 10. The dataset 48 may include ten base station states 26 for each transmission slot 18 that occurred. In addition, the dataset 48 may include ten runtimes 22 per signal processing task 14, resulting in one hundred and twenty runtimes 22 stored in dataset 48.

The base station state 26 may include everything that was included in memory. As such, the base station state 26 may include a plurality of features present in the base station 110 when the transmission slot 18 occurred and recorded in memory. One example may include the base station state 26 including over 2,000 features of the base station 110 recorded in memory.

At 406, method 400 may include performing a feature selection from the dataset to identify a subset of features. Machine learning system 112 may perform, for each signal processing task 14, a feature selection to identify a subset of features 50 from the base station state 26 that effect the runtime 22 of the signal processing task 14. Machine learning system 112 may select a combination of features from the base station state 26 to include in the subset of features 50.

Machine learning system 112 may use a combination of techniques for identifying the selected features to include in the subset of features 50. One technique may include selecting features based on domain expertise. The selected features may be picked using previous knowledge or domain expertise of features that will affect the runtime 22 of the signal processing tasks 14 (e.g., increase the runtime 22 or reduce the runtime 22). Examples of selected features that may be based on domain expertise may include, but are not limited to, a number of users, packet size, transfer load size of users (e.g., an amount of data users are sending or receiving), and/or a number of layers being used in a communication. For example, a large data packet may increase the runtime 22 of a signal processing task 14.

Another technique may include using a machine learning feature selection for choosing additional features that may affect the runtime 22 of the signal processing tasks 14 to include in the subset of features 50. The machine learning feature selection may include removing all features that may remain constant or quasi constant from consideration. If the features remained constant or quasi constant during the signal processing tasks 14, the features may not affect the runtime 22, as such, the machine learning feature selection may remove the features from consideration for the subset of features 50.

The machine learning feature selection may use a distance correlation filter to identify features that are correlated to the runtime 22 of the signal processing tasks 14. For example, as the value of the features increase, the runtime 22 increases, and as the value of the features decrease, the runtime 22 decreases.

The machine learning feature selection may apply a backward elimination technique using a decision tree to identify the subset of features 50 that provides a high level of accuracy. The machine learning feature selection may start with a large number of features, such as, all the selected features using domain expertise and all the features identified using the distance correlation filter. The machine learning feature selection may train the decision tree with a different combination of features until a level of accuracy is achieved. For example, the machine learning feature selection may identify a target goal of up to 20 features. As such, the machine learning feature selection may select different combination of features up to 20 to use to train the decision tree. The training may use the information from dataset 48 to train the decision tree and verify the accuracy of the decision tree. For example, 70% of the information may be used for training the decision tree and the remaining 30% of the information may be used for verifying accuracy of the decision tree.

The machine learning feature selection may select a combination of features that provide the highest level of accuracy for the subset of features 50. For example, if a combination of 8 features provided the highest level of accuracy, the machine learning feature selection may select the combination of 8 features to include in the subset of features 50.

The machine learning feature selection may identify the subset of features 50 for each signal processing task 14 that ran during the profiling tests 46. As such, the subset of features 50 may be a combination of features identified as being important to the runtime 22 for each signal processing task 14. The subset of features 50 may be different for each individual signal processing task 14.

At 408, method 400 may include generating offline prediction models using the subset of features. Machine learning system 112 may use the subset of features 50 to generate one or more offline prediction models for the signal processing tasks 14. In an implementation, the offline prediction model may be used to train a quantile decision tree 24. A quantile decision tree 24 may include a decision tree with a leaf node containing a window of values with a plurality of values instead of a single value. The leaf node of the quantile decision tree 24 may be used to identify a quantile of values stored in the leaf node.

Machine learning system 112 may use the subset of features 50 for each signal processing task 14 to train a quantile decision tree 24 for each signal processing task 14. Thus, there may be one quantile decision tree 24 per signal processing task 14. The different leaf nodes of the quantile decision trees 24 may include a window of values for the different runtimes 22 that resulted based on the subset of features 50.

Machine learning system 112 may save the trained offline models, e.g., the different quantile decision trees 24 for each signal processing task 14. The different quantile decision trees 24 may be used to predict different runtimes 22 that may occur for signal processing tasks 14 when various factors may be present in the base station 110.

Figure 5:
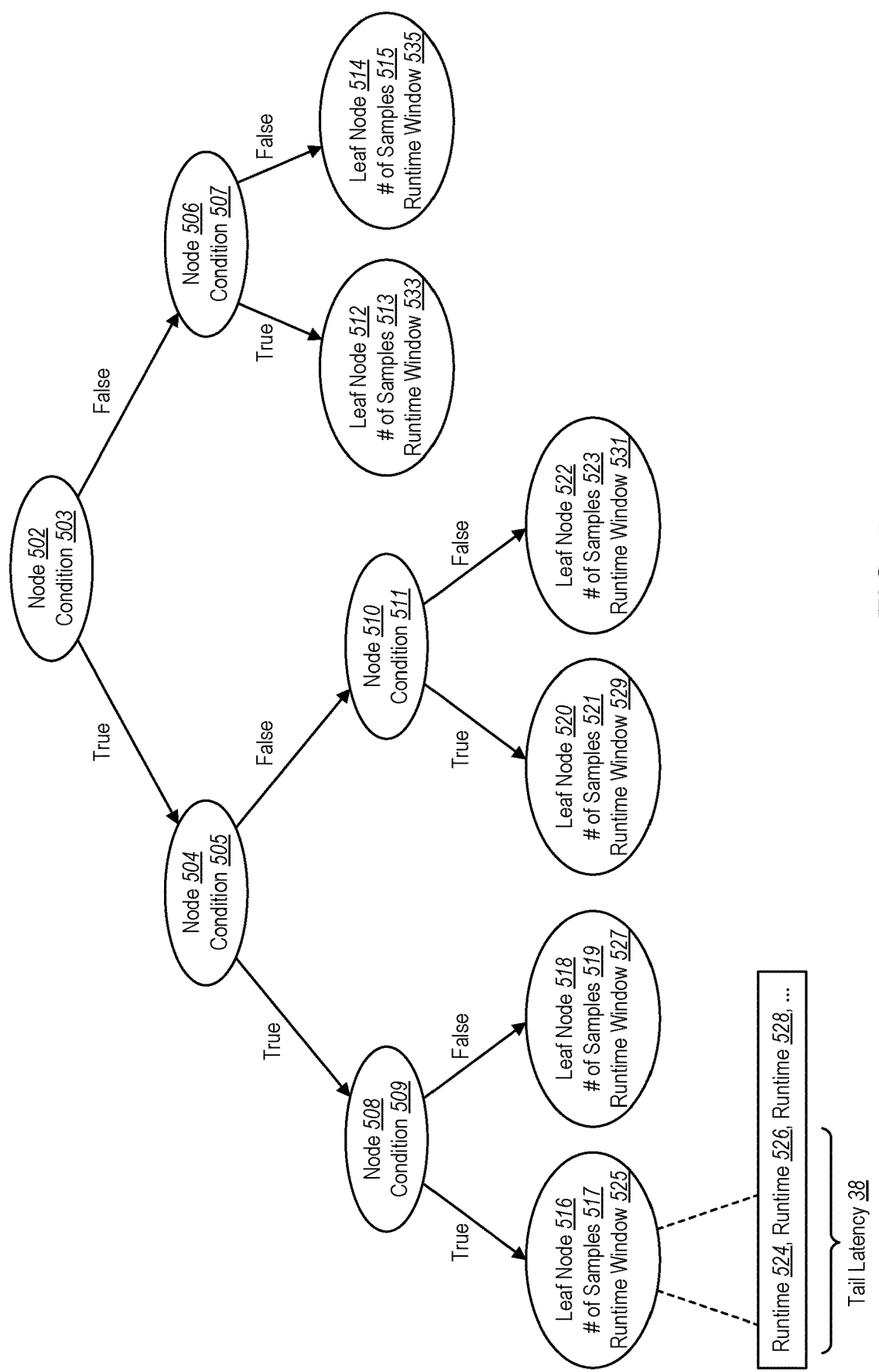
FIG. 5 illustrates an example of a quantile decision tree in accordance with an implementation of the present disclosure.

Referring now to FIG. 5, illustrated is an example of a quantile decision tree 24 for a signal processing task 14 (FIG. 1) generated by a machine learning system 112 (FIG. 3) for use by vRAN 10 (FIG. 1) and/or scheduler 20 (FIG. 1). Quantile decision tree 24 may be traversed by vRAN 10 to add additional online observed runtimes 22 to the quantile decision tree 24 for different signal processing tasks 14. In addition, quantile decision tree 24 may be used by scheduler 20 to identify a tail latency 38 of a predicted worst case execution time 36 for a signal processing task 14 based on the current base station state 26.

For example, quantile decision tree 24 may be for a PUSCH decoding signal processing task 14. Quantile decision tree 24 may include five nodes, Node 502, Node 504, Node 506, Node 508, and Node 510. The number of nodes in quantile decision tree 24 may correspond to a combination of features included in the subset of features 50 (FIG. 4) identified by machine learning system 112 as important to the PUSCH decoding signal processing task 14. For example, the identified features may include, but are not limited to, transfer load size, number of code blocks, and number of modulated resource elements.

Each node (Node 502, Node 504, Node 506, Node 508, and Node 510) may have a different condition statement 503, 505, 507, 509, 511 based on the different features identified for the subset of features 50. For example, Node 502 may have a condition statement 503 regarding the TB size. Node 504 may have a condition statement 505 regarding the number of modulated REs. Node 508 may have a condition statement 509 regarding the number of code blocks.

Quantile decision tree 24 may include a plurality of leaf nodes 512, 514, 516, 518, 520, 522. The plurality of leaf nodes 512, 514, 516, 518, 520, 522 may identify the number of samples 513, 515, 517, 519, 521, 523 included in each leaf node. The number of samples 513, 515, 517, 519, 521, 523 may include the collected samples of the different signal processing tasks 14 observed offline or online with the features identified by the different condition statements 503, 505, 507, 509, 511.

In addition, each of the plurality of leaf nodes 512, 514, 516, 518, 520, 522 may store a runtime window 525, 527, 529, 531, 533, 535. Each runtime window 525, 527, 529, 531, 533, 535 may include a plurality of runtimes for the signal processing tasks 14 for the collected samples observed offline with machine learning system 112 or online with vRAN 10. For example, runtime window 525 may include a plurality of runtimes 524, 526, 528 up to n runtimes, where n is an integer. Each runtime window 525, 527, 529, 531, 533, 535 may include different values for the plurality of runtimes stored. In addition, the runtime windows 525, 527, 529, 531, 533, 535 may be used to identify a tail latency 38 of the plurality of runtimes stored. For example, the tail latency 38 for runtime window 525 may include runtime 524 and runtime 526. The tail latency 38 may identify a percentile (e.g., 99%) of the slowest runtimes stored. Scheduler 20 may use the tail latency 38 in predicting a worst case execution time 36 for a signal processing task 14.

vRAN 10 and/or scheduler 20 may traverse the quantile decision tree 24 based on a current base station state 26. For example, the current base station state 26 may include the following features (the number of modulated REs is equal to 8,000; the TB size is equal to 1680; and the number of code blocks is equal to 2). vRAN 10 and/or scheduler 20 may start at Node 502 and compare the condition statement 503 to the features. If the condition is true, vRAN 10 and/or scheduler 20 may move to Node 504 and repeat the process withe the condition statement 505. However, if the condition is false, vRAN 10 and/or scheduler 20 may move to Node 506 and repeat the process with condition statement 507.

vRAN 10 and/or scheduler 20 may continue until arriving at a leaf node 516 that corresponds to the features for the current base station state 26. vRAN 10 may update the runtime window 525 for leaf node 516 with a new runtime observed for the PUSCH decoding signal processing task 14. In addition, scheduler 20 may use the runtime window 525 to identify a tail latency 38 of the PUSCH decoding signal processing task 14 based on the current base station state 26 and may estimate a worst case execution time 36 for the PUSCH decoding signal processing task 14 using the tail latency 38.

As such, quantile decision tree 24 may be used by the vRAN 10 to continue to train the quantile decision tree 24 with new observed runtimes 22 for signal processing tasks 14, as discussed in more detail below in FIG. 6. Quantile decision tree 24 may also be used by scheduler 20 to predict the worst case execution time 36 for signal processing tasks 14, as discussed in more detail below if FIG. 7.

Figure 6:
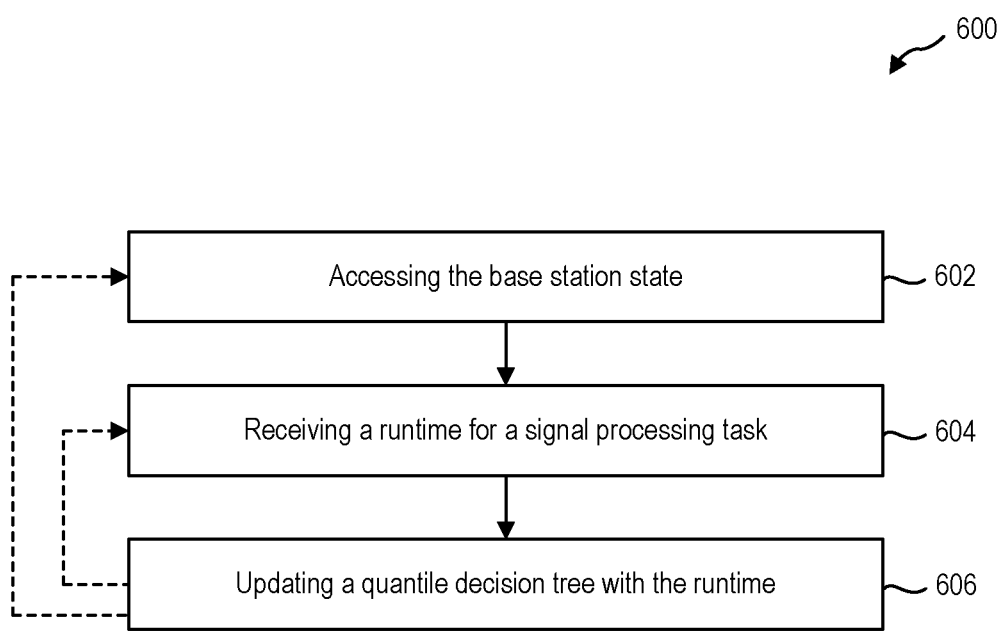
FIG. 6 illustrates an example method for online training of a quantile decision tree in accordance with an implementation of the present disclosure.

Referring now to FIG. 6, an example method 600 for online training of a quantile decision tree 24 (FIG. 1) by the vRAN 10 (FIG. 1). Method 600 may be executed by the vRAN 10 every transmission slot 18 for each signal processing task 14 running on the vRAN 10 during the transmission slot 18. In addition, method 600 may be executed online when additional workloads may be present on the vRAN 10 along with the signal processing tasks 14 occurring on the vRAN 10. The actions of method 600 may be discussed below with reference to the architectures of FIGS. 1 and 5.

At 602, method 600 may include accessing the base station state. vRAN 10 may access a portion of the base station state 26 for base station 110 during the transmission slot 18. vRAN 10 may have a base station state 26 stored in memory for each base station 110 in communication with vRAN 10. For example, vRAN 10 may access the subset of features 50 (FIG. 1) identified to affect the runtime 22 of the signal processing task 14 running on vRAN 10 during the transmission slot 18. As such, vRAN 10 may only access the features of the base station state 26 related to the subset of features 50.

At 604, method 600 may include receiving a runtime for the signal processing task. vRAN 10 may receive the runtime 22 for the signal processing task 14 running on vRAN 10 during the transmission slot 18. The runtime 22 may be observed online in real-time by the vRAN 10 while additional workloads may be present on the vRAN 10 that may affect the runtime 22 of the signal processing tasks 14.

At 606, method 600 may include updating the quantile decision tree with the runtime. vRAN 10 may traverse the quantile decision tree 24 for the signal processing task 14 and may add the runtime 22 to the corresponding leaf node based on the current base station state 26. The leaf node is selected depending on what features are present in the base station state 26.

vRAN 10 may store the runtime 22 to a runtime window stored at the selected leaf node. The runtime window may be a rolling window of runtimes 22. Older runtimes 22 may be replaced with newer runtimes 22. For example, the runtime window may include 20,000 samples. As new runtimes 22 are received, older runtimes 22 may be removed from the runtime window if the number of samples is exceeded (e.g., 20,000). As such, the quantile decision tree 24 may continue to be trained online with newer samples of runtimes 22 observed by the vRAN 10.

Method 600 may repeat to 604 for each signal processing task 14 running during the transmission slot 18. Thus, the corresponding quantile decision tree 24 for each signal processing task 14 running during the transmission slot 18 may be updated with a corresponding runtime 22. In addition, method 600 may continue to repeat for each transmission slot 18. As a new transmission slot 18 occurs, the quantile decisions trees 24 may be updated with the runtimes 22 for each signal processing task 14 running during the new transmission slot 18.

For example, if vRAN 10 had 50 signal processing tasks 14 occurring over different transmission slots 18, method 600 may be used to update 50 different quantile decision trees 24 with the runtimes 22 observed during the different transmission slots 18 for each of the processing tasks 14.

Method 600 may be used to continually modify the quantile decision trees 24 with new observed online runtimes 22 for signal processing tasks 14 occurring on vRAN 10, and thus, adapting the observed runtimes 22 to any changing system conditions.

Figure 7:
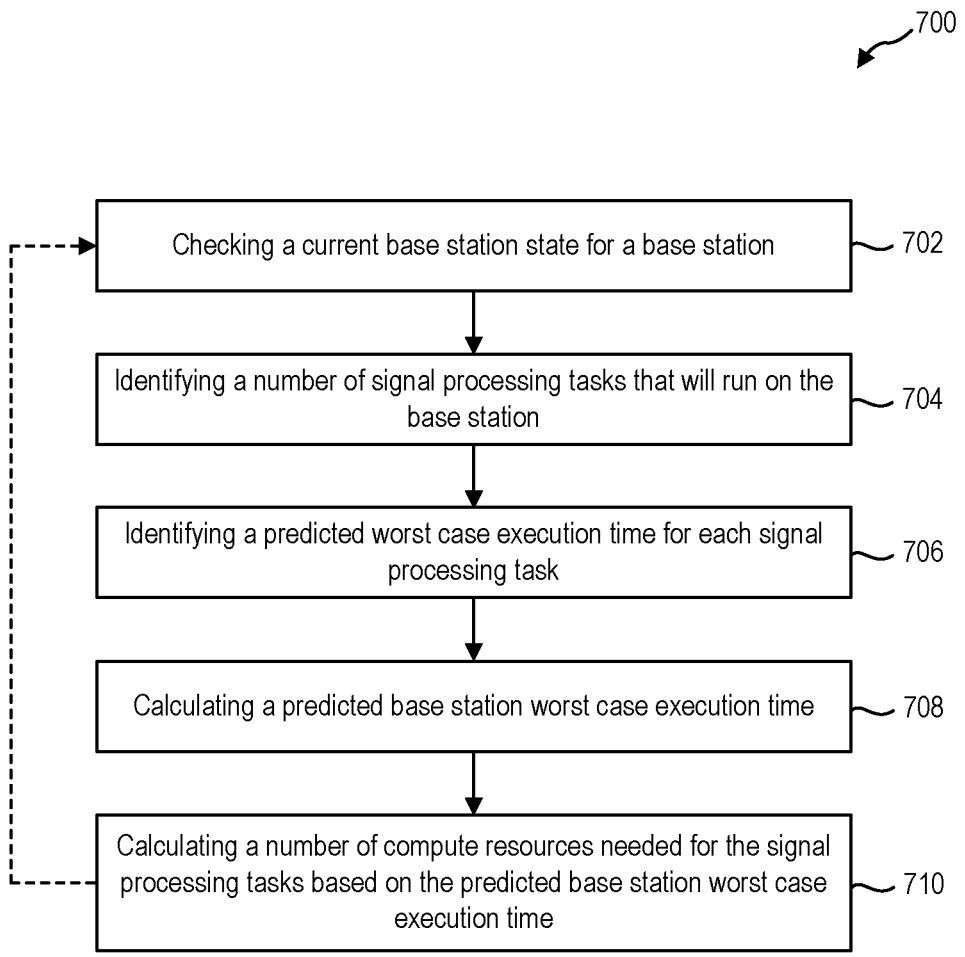
FIG. 7 illustrates an example method for predicting compute resource requirements in accordance with an implementation of the present disclosure.

Referring now to FIG. 7, an example method 700 for predicting compute resource requirements may be executed by scheduler 20. Scheduler 20 may repeat method 700 repeatedly at a set time interval. The actions of method 700 may be discussed below with reference to the architecture of FIG. 1.

At 702, method 700 may include checking a current base station state for a base station. Scheduler 20 may receive a current base station state 26 from vRAN 10. The current base station state 26 may include a plurality of factors associated with the signal processing tasks 14. For example, the plurality of factors may include, but are not limited to, a number or users using base station 110, packet sizes, signal quality, type of traffic (e.g., uplink or downlink), a number of cells, and/or a number of layers. As such, scheduler 20 may receive the plurality of factors for the current base station state 26 at the time scheduler 20 checks the base station state 26. The base station state 26 may change at different points in time as the plurality of factors may change.

At 704, method 700 may include identifying a number of signal processing tasks that will run on the base station. The number of signal processing tasks 14 that will run on the base station 110 may be a predefined value. As such, scheduler 20 may identify which signal processing tasks 14 will run during the transmission slot 18.

At 706, method 700 may include identifying a predicted worst case execution time for each signal processing task. Scheduler 20 may identify for each identified signal processing task 14, a predicted worst case execution time 36 for the processing task 14. Scheduler 20 may identify the predicted worst case execution time 36 using different techniques, or a combination of different techniques.

One technique may include scheduler 20 accessing each quantile decision tree 24 on vRAN 10 for the identified signal processing tasks 14 that will run on the base station 110 during the transmission slot 18. Scheduler 20 may use the plurality of factors from the current base station state 26 to traverse each quantile decision tree 24 and identify the leaf node corresponding to the plurality of factors present in the current base station state 26 for each signal processing task 14.

Scheduler 20 may identify the predicted worst case execution time 36 by identifying a tail latency 38 of the runtime window for the leaf node. The tail latency 38 may be a selected percentile of the runtime window. For example, the tail latency 38 may be the 99.9% of the sample runtimes 22 included in the runtime window in the leaf node. As such, scheduler 20 may use the sample runtimes 22 with the slowest times in the 99.9% to predict the worst case execution time 36 for the signal processing task 14.

Another technique may include scheduler 20 using a linear regression model to identify the worst case execution time 36 for each signal processing task 14. For example, scheduler 20 may use the plurality of factors from the current base station state 26 in a linear regression model trained by machine learning system 112 to identify the worst case execution time 36 for each signal processing task 14.

Yet another technique may include scheduler 20 using a gradient boost regressor model to identify the worst case execution time 36 for each signal processing task 14. For example, scheduler 20 may use the plurality of factors from the current base station state 26 in a gradient boost regressor model trained by machine learning system 112 to identify the worst case execution time 36 for each signal processing task 14.

Yet another technique may include scheduler 20 using a cubist decision tree to identify the worst case execution time 36 for each signal processing task 14. For example, scheduler 20 may use the plurality of factors from the current base station state 26 to traverse cubist decision trees trained by machine learning system 112 to identify the worst case execution time 36 for each signal processing task 14.

As such, scheduler 20 may use different techniques or a combination of techniques to predict the worst case execution time 36 for the signal processing tasks 14 based on the current base station state 26.

At 708, method 700 may include calculating a predicted base station worst case execution time. Scheduler 20 may calculate a predicted base station worst case execution time 40 for the base station 110 by summing the different predicted worst case execution times 36 for each of the signal processing tasks 14 that will run on base station 110 during the transmission slot 18.

At 710, method 700 may include calculating a number of compute resources needed for the signal processing tasks based on the predicted base station worst case execution time. Scheduler 20 may calculate a number of compute resources 42 required for completing the signal processing tasks 14 based on the predicted base station worst case execution time 40.

In an implementation, scheduler 20 may use the below equation (1) to calculate the number of compute resources 42 required:

$$\text{Num\_cores} = \frac{\sum (WCET_{Task_i} - \text{runtime}_{Task_i})}{TTI \text{ Deadline} - \text{slot runtime}} \quad (1)$$

Where $WCETTask_i$ is the predicted worst case execution time 36 for each signal processing task 14 and $RuntimeTask_i$ is an amount of elapsed time for a particular signal processing task 14 since the beginning of the task execution. Different signal processing tasks 14 will run and complete as time progresses during the transmission slot 18. Moreover, signal processing tasks 14 may start at different times during the transmission slot 18. As such, the predicted worst case execution time 36 for each signal processing task 14 may be adjusted by subtracting the amount of time that has elapsed for each particular signal processing task 14.

In addition, the TTIDeadline is the transmission deadline 16 for the base station 110 for which all signal processing tasks 14 must complete by in order to prevent performance degradation to a user device in communication with base station 110. The transmission deadline 16 may be a value less than the transmission slot 18 to ensure the signal processing tasks 14 are complete prior to the transmission deadline 16. For example, transmission deadline 16 may be 0.125 us and the transmission slot 18 may be 1 ms. The slot runtime is an amount of time that has elapsed since the beginning of the transmission slot 18 when scheduler 20 is checking. For example, if scheduler 20 is running every 20 microseconds, the slot runtime for a first check by scheduler 20 is 20 microseconds and the slot runtime for a second check by scheduler 20 is 40 microseconds. As such, the transmission deadline 16 may be adjusted by subtracting the amount of time that has elapsed for each signal processing tasks 14 to identify an amount of time remaining to meet the transmission deadline 16.

The Num_Cores may be equal to the number of compute resources 42 calculated by summing up for each of the different signal processing task 14 the difference between the predicted worst case execution time 36 for that signal processing task 14 and the amount of time that has already elapsed in that particular transmission slot 18 before scheduler 20 performed the check for the base station state 26 and dividing by an amount of time remaining to meet a transmission deadline 16.

The number of compute resources 42 may include a minimum number of CPU cores 102 that may be used while still meeting the transmission deadline 16 for the signal processing tasks 14. As such, scheduler 20 may allocate the number of compute resources 42 identified to vRAN 10 for the signal processing tasks 14 by having a notion of the real-time slot deadlines.

For example, the vRAN 10 may have access to four CPU cores 102. Scheduler 20 may identify that two CPU cores 102 may be needed for completing the signal process tasks 14 by the transmission deadline 16 based on the worst case execution time for the base station. Thus, scheduler 20 may allocate two CPU cores 102 of the available four CPU cores 102 to vRAN 10 to use for the signal processing tasks 14.

In an implementation, if scheduler 20 is unable to predict a worst case execution time for a particular signal processing task 14, scheduler 20 may allocate all of the available compute resources to vRAN 10 to complete the signal processing task 14. For example, if enough data samples have not been collected in quantile decision tree 24 for a signal processing task 14, scheduler 20 may not be able to make a prediction for the worst case execution time 36 for the signal processing task 14. Thus, scheduler 20 may provide vRAN 10 access to all of the available CPU cores 102 to ensure that the signal processing task 14 completes by the transmission deadline 16.

Method 700 may repeat at a set time interval. For example, scheduler 20 may perform method 700 every 20 microseconds. If the transmission slot 18 is 1 ms, method 700 may repeat multiple times during a transmission slot 18 and the number of compute resources calculated may change each time method 700 is performed. As such, the number of compute resources allocated to vRAN 10 for the signal processing tasks 14 may dynamically change throughout a transmission slot 18 to ensure all of the signal processing tasks 14 are completed by the transmission deadline 16. For example, the number of compute resources may increase and/or decrease based on the updated predicted worst case execution time for the base station 110.

Figure 8:
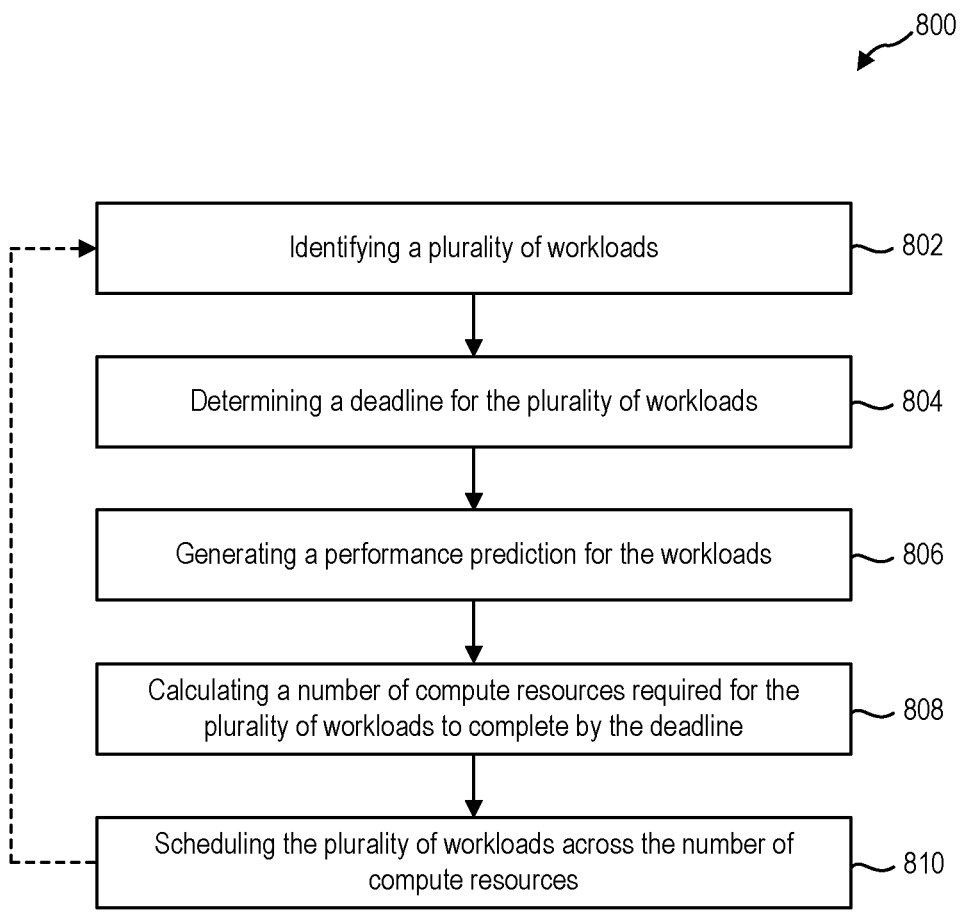
FIG. 8 illustrates an example method for scheduling workloads across a plurality of compute resources in accordance with an implementation of the present disclosure.

Referring now to FIG. 8, illustrated is a method 800 for scheduling workloads by scheduler 20 (FIG. 1) across a plurality of compute resources 104 (FIG. 1) available for use. Method 800 may repeat at a predetermined time interval. For example, scheduler 20 may repeat method 800 every 20 us. The actions of method 800 may be discussed below with reference to the architectures of FIGS. 1 and 2.

At 802, method 800 may include identifying a plurality of workloads. Scheduler 20 may identify a plurality of workloads available for processing at server 106. The plurality of workloads may include vRAN workloads 12 and other workloads 12 from one or more applications 44. The vRAN workloads 12 may include a plurality of workloads for communicating with base station 110. vRAN workloads 12 may include, but are not limited to, real-time workloads, low-latency workloads, and/or data link layer (L2) tasks. For example, L2 tasks may include, but are not limited to, medium access control (MAC) tasks, radio link control (RLC) tasks, and/or packet data convergence protocol (PDCP) tasks. An example low-latency vRAN workloads 12 may include different signal processing tasks 14 of base station 110. Examples of signal processing tasks 14 may include, but are not limited to, encoding tasks, decoding tasks, layer mapping tasks, layer de-mapping tasks, modulation tasks, and/or demodulation tasks.

In addition, the other workloads 12 may include any processing that may occur by applications 44 at the edge. Other workloads 12 may include, but are not limited to, graphics workloads, database workloads, video workloads, internet of things (IoT) workloads, gaming workloads, and/or artificial intelligence workloads. Applications 44 may be part of server 106 and/or may be in communication with server 106 from a remote location.

At 804, method 800 may include determining a deadline for the plurality of workloads. Scheduler 20 may determine a deadline 32 for the vRAN workloads 12. For example, the deadline 32 may be a transmission deadline 16 associated with the vRAN workloads 12. The transmission deadline 16 may be a time value for the base station 110 for which all signal processing tasks 14 must be completed by in order to prevent performance degradation to a user device in communication with base station 110. An example range for the transmission deadline 16 may include any value between 0.125 us and 1 ms. The transmission deadline 16 may be a known value for the base station 110. In addition, different base stations 110 may have different transmission deadlines 16. As such, scheduler 20 may determine any deadlines that must be met by the vRAN workloads 12.

At 806, method 800 may include generating a performance prediction for the workloads. Scheduler 20 may predict the worst case execution time 36 of individual signal processing tasks 14 by observing the vRAN traffic characteristics in real-time during transmission slot 18. Scheduler 20 may use a machine learning model 34 generated by a machine learning system 112 that uses a set of quantile decision trees 24 in order to predict the worst case execution time 36 of the vRAN signal processing tasks 14 in real-time based on the current base station state 26 and on a set of collected samples of recent task runtimes 22. For example, scheduler 20 may use a quantile decision tree 24 of a machine learning model 34 to identify a tail latency 38 of the runtimes 22 of the signal processing tasks 14. Scheduler 20 may use the tail latency 38 for individual signal processing tasks 14 to predict the worst case execution time 36 of the individual signal processing tasks 14.

Scheduler 20 may use a quantile of a tail latency 38 for each of the signal processing tasks 14 in the vRAN workloads 12 to determine a predicted amount of time it will take to complete each of the signal processing tasks 14.

At 808, method 800 may include calculating a number of compute resources required for the plurality of workloads to complete by the deadline. Server 106 may include a plurality of compute resources 104 available for use. Scheduler 20 may calculate a number of compute resources 42 required for the vRAN workloads 12 to complete by the determined deadline. For example, the number of compute resources 42 required may ensure that the signal processing tasks 14 for the vRAN workloads 12 may be completed by the transmission deadline 16.

In an implementation, scheduler 20 may use method 700 described in FIG. 7 to calculate the number of compute resources required for the plurality of vRAN workloads 12. Scheduler 20 may use a quantile of a tail latency 38 for each of the signal processing tasks 14 in the vRAN workloads 12 to determine a predicted amount of time it will take to complete each of the signal processing tasks 14. Scheduler 20 may use this prediction in calculating the number of compute resources 42 required for the plurality of vRAN workloads 12.

The number of compute resources 42 required may be a subset of the plurality of compute resources 104 available. For example, the number of compute resources 42 required may be a minimum number of compute resources that may be used to ensure that the vRAN workloads 12 are processed before the transmission deadline 16. In addition, the number of compute resources 42 required may include all of the available compute resources. The number of compute resources 42 required may change as task complete for the vRAN workloads 12. In addition, the number of compute resources 42 required may change as tasks are added to the vRAN workloads 12.

At 810, method 800 may include scheduling the plurality of workloads across the number of compute resources. Scheduler 20 may allocate the plurality of workloads across the number of available compute resources 104. For example, scheduler 20 may allocate the vRAN workloads 12 across the number of compute resources 42 required.

Scheduler 20 may take into account any dependencies that the different signal processing tasks 14 may have and scheduler 20 may place as may signal processing tasks 14 with dependencies together into as few CPU cores 102 as possible. By placing signal processing tasks 14 with dependencies into fewer CPU cores 102, the processing time for the signal processing tasks 14 may decrease because the different signal processing tasks 14 have access to the same cache and data. By using the same cache, the signal processing may have better performance with lower latency between signal processing tasks 14 and lower runtimes 22 for the signal processing tasks 14.

Scheduler 20 may schedule the other workloads 12 on any remaining CPU cores 102 that may be available after scheduling the vRAN workloads 12 on the number of compute resources 42 required. For example, if server 106 had ten CPU cores 102 available for use and scheduler 20 calculates that six CPU cores 102 are required for the vRAN workloads 12, scheduler 20 may schedule the vRAN workloads 12 across six CPU cores 102 and may schedule the other workloads 12 across the remaining four CPU cores 102 available. Thus, the vRAN workloads 12 and the other workloads 12 may be collocated on the plurality of available compute resources 104 simultaneously.

Scheduler 20 may apply a higher priority to the one or more vRAN workloads 12 relative to other workloads 12 that may be available for processing by compute resources 104. Scheduler 20 may use the higher priority to ensure the one or more vRAN workloads 12 are processed first by the available compute resources 104 before other workloads 12 are processed by the available compute resources 104. Thus, method 800 may enable statistical multiplexing by scheduler 20 between vRAN workloads 12 (high priority) and other workloads 12 (best effort) at a 20 us granularity.

Method 800 may repeat at a set time interval. For example, scheduler 20 may perform method 800 every 20 microseconds. Scheduler 20 may make scheduling decisions at a very fine time granularity (20 us), which allows scheduler 20 to intervene and proactively acquire more CPU cores for vRAN 10 if on track to miss a deadline, e.g. due to a misprediction of the expected vRAN CPU requirements or due to unexpected interference from other collocated workloads or the OS. As a result, method 800 may be used to reclaim a large portion (up to 70%) of the compute resources allocated to the vRAN 10, which can now be used by other workloads, without violating any signal processing deadlines.

Figure 9:
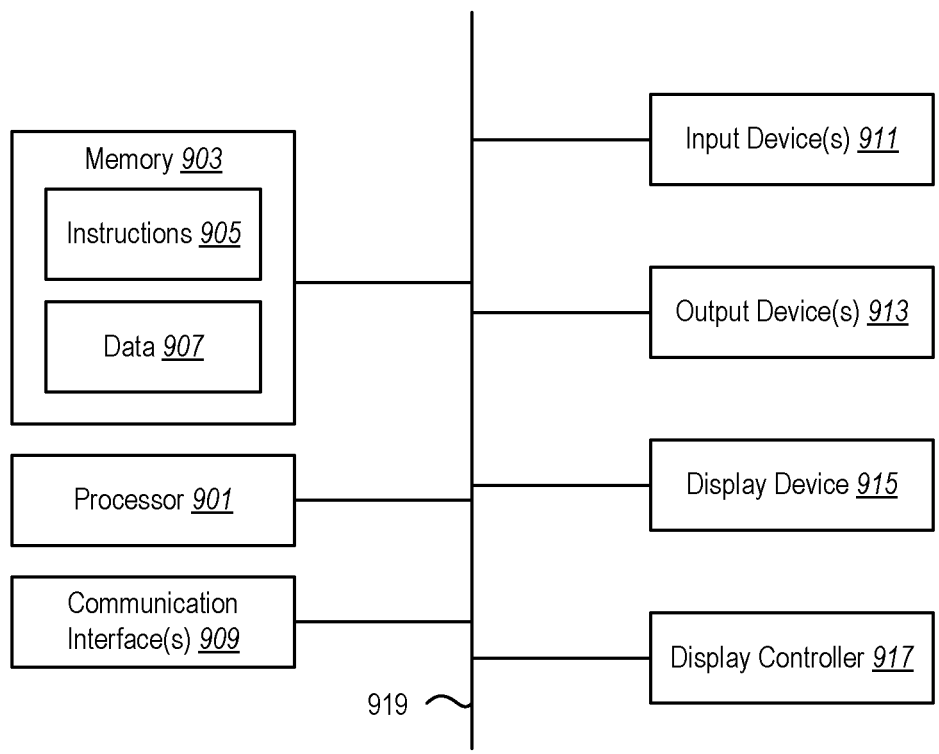
FIG. 9 illustrates certain components that may be included within a computer system.

FIG. 9 illustrates certain components that may be included within a computer system 900. One or more computer systems 900 may be used to implement the various devices, components, and systems described herein.

The computer system 900 includes a processor 901. The processor 901 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   identifying a plurality of virtualized Radio Access Networks (vRAN) workloads and a plurality of other workloads;
   monitoring and recording vRAN traffic characteristics of a current base station state of a base station used to perform the plurality of vRAN workloads in real time during each transmission slot in a memory;
   predicting a worst case execution time for each signal processing task of the plurality of vRAN workloads by using a plurality of quantile decision trees based on the vRAN traffic characteristics recorded, wherein the worst case execution time indicate a prediction for how long a signal processing task will take to complete;
   calculating a number of compute resources required for the plurality of vRAN workloads to use to complete by a deadline by determining a difference between the predicted worst case execution time for each signal processing task of the plurality of vRAN workloads and an amount of time elapsed in a transmission slot for each signal processing task divided by a remaining amount of time to meet the deadline;
   scheduling the plurality of vRAN workloads across the number of compute resources required;
   executing the plurality of vRAN workloads based on the scheduling of the plurality of vRAN workloads;
   determining a remaining number of available compute resources after scheduling the plurality of vRAN workload across the number of compute resources required;
   scheduling the plurality of other workloads across the remaining number of available compute resources; and
   executing the plurality of other workloads based on the scheduling of the plurality of other workloads.

2. The method of claim 1, wherein the plurality of vRAN workloads include one or more signal processing tasks for data link layer (L2) tasks.

3. The method of claim 2, wherein the deadline is a transmission deadline for transmission of the one or more signal processing tasks with the base station or reception of the one or more signal processing tasks with the base station.

4. The method of claim 2, wherein the worst case execution time for each signal processing task is generated by:
   using a machine learning model to generate the plurality of quantile decision trees, where each quantile decision tree is associated with an individual signal processing task; and
   identifying a tail latency of a leaf node in a corresponding quantile decision tree for the individual signal processing task for each of the one or more signal processing tasks.

5. The method of claim 4, wherein the tail latency indicates the worst case execution time for the individual signal processing tasks.

6. The method of claim 4, wherein the machine learning model is trained with offline samples of signal processing tasks and online samples of signal processing tasks.

7. The method of claim 2, wherein calculating the number of compute resources required further comprises:
   determining a predicted base station worst case execution time for the base station by summing the predicted worst case execution time for each workload; and
   calculating the number of compute resources required to complete the plurality of vRAN workloads by the deadline based on the predicted base station worst case execution time.

8. The method of claim 1, further comprising:
   acquiring more compute resources for the plurality of vRAN workloads in response to determining the deadline is going to be missed.

9. A server, comprising:
   a memory to store data and instructions; and
   at least one processor in communication with a plurality of compute resources and a virtualized Radio Access Network (vRAN), wherein the at least one processor is operable to:
   identify a plurality of vRAN workloads and a plurality of other workloads;
   monitor and record vRAN traffic characteristics of a current base station state of a base station used to perform the plurality of vRAN workloads in real time during each transmission in the memory;
   predict a worst case execution time for each signal processing task of the plurality of vRAN workloads by using a plurality of quantile decision trees based on the vRAN traffic characteristics recorded, wherein the worst case execution time indicate a prediction for how long a signal processing task will take to complete;
   calculate a number of compute resources of the plurality of compute resources required for the plurality of vRAN workloads to complete by a deadline by determining a difference between the predicted worst case execution time for each signal processing task of the plurality of vRAN workloads and an amount of time elapsed in a transmission slot for each signal processing task divided by a remaining amount of time to meet the deadline;

schedule the plurality of vRAN workloads across the number of compute resources required;

execute the plurality of vRAN workloads based on the scheduling of the plurality of vRAN workloads;

determine a remaining number of available compute resources of the plurality of compute resources after scheduling the plurality of vRAN workload across the number of compute resources required;

schedule the plurality of other workloads across the remaining number of available compute resources; and execute the plurality of other workloads based on the scheduling of the plurality of other workloads.

10. The server of claim 9, wherein the plurality of vRAN workloads include one or more signal processing tasks for a base station or data link layer (L2) tasks.

11. The server of claim 10, wherein the deadline is a transmission deadline for transmission of the one or more signal processing tasks with the base station or reception of the one or more signal processing tasks with the base station.

12. The server of claim 10, wherein the at least one processor is further operable to generate the worst case execution time for each signal processing task by:
using a machine learning model to generate the plurality of quantile decision trees, where each quantile decision tree is associated with an individual signal processing task; and
identifying a tail latency of a leaf node in a corresponding quantile decision tree for the individual signal processing task for each of the one or more signal processing tasks.

13. The server of claim 12, wherein the tail latency indicates the worst case execution time for the individual signal processing tasks.

14. The server of claim 12, wherein the machine learning model is trained with offline samples of signal processing tasks and online samples of signal processing tasks.

15. The server of claim 10, wherein the at least one processor is further operable to calculate the number of compute resources required by:

determining a predicted base station worst case execution time for the base station by summing the predicted worst case execution time for each workload; and
calculating the number of compute resources required to complete the plurality of vRAN workloads by the deadline based on the predicted base station worst case execution time.

16. A method, comprising:
identifying a plurality of workloads to complete;
monitoring and recording a current base station state of a base station used to perform the plurality of workloads in real time during each transmission slot in a memory;
identifying a quantile at a tail latency for each signal processing task of the plurality of workloads, wherein the tail latency indicates a predicted worst case execution time of the signal processing tasks;
calculating a number of compute resources required for the plurality of workloads to complete by a deadline by determining a difference between the predicted worst case execution time for each workload and an amount of time elapsed in a transmission slot for each workload divided by a remaining amount of time to meet the deadline;
scheduling the plurality of workloads across the number of compute resources; and
executing the plurality of workloads based on the scheduling.

17. The method of claim 16, wherein the tail latency is a range of values that indicate a slow runtime of the workload.

18. The method of claim 16, wherein a machine learning model generates a plurality of quantile decision trees for each workload and the tail latency is identified in a leaf node of each quantile decision tree of the plurality of quantile decision trees.

19. The method of claim 16, wherein the plurality of compute resources includes one or more of a central processing unit (CPU) core, a field programmable gate array (FPGA), a graphics processing unit (GPU), or other hardware accelerators.

20. The method of claim 16, wherein the deadline is a transmission deadline for the plurality of workloads or a completion deadline for the plurality of workloads.

* * * * *